E. F. BEUGLER.
MACHINE FOR REMOVING HOOPS FROM BARRELS.
APPLICATION FILED JULY 2, 1917.

1,315,275.

Patented Sept. 9, 1919.
5 SHEETS—SHEET 1.

Fig. 1.

Inventor;
Edwin F. Beugler
by Geyer & Popp
Attorneys.

E. F. BEUGLER.
MACHINE FOR REMOVING HOOPS FROM BARRELS.
APPLICATION FILED JULY 2, 1917.

1,315,275. Patented Sept. 9, 1919.
5 SHEETS—SHEET 2.

Inventor;
Edwin F. Beugler
by Geyer & Popp
Attorneys.

E. F. BEUGLER.
MACHINE FOR REMOVING HOOPS FROM BARRELS.
APPLICATION FILED JULY 2, 1917.

1,315,275.

Patented Sept. 9, 1919.
5 SHEETS—SHEET 3.

E. F. BEUGLER.
MACHINE FOR REMOVING HOOPS FROM BARRELS.
APPLICATION FILED JULY 2, 1917.

1,315,275.

Patented Sept. 9, 1919.
5 SHEETS—SHEET 5.

UNITED STATES PATENT OFFICE.

EDWIN F. BEUGLER, OF BUFFALO, NEW YORK, ASSIGNOR TO E. & B. HOLMES MACHINERY COMPANY, OF BUFFALO, NEW YORK, A CORPORATION OF NEW YORK.

MACHINE FOR REMOVING HOOPS FROM BARRELS.

1,315,275.  Specification of Letters Patent.  Patented Sept. 9, 1919.

Application filed July 2, 1917. Serial No. 178,059.

*To all whom it may concern:*

Be it known that I, EDWIN F. BEUGLER, a citizen of the United States, residing at Buffalo, in the county of Erie and State of New York, have invented new and useful Improvements in Machines for Removing Hoops from Barrels, of which the following is a specification.

This invention relates to a machine for removing the temporary hoops of the shell or body of barrels after applying the permanent bilge hoops thereto and before applying the end hoops to the same.

In the case of heavy barrels, such as those used for packing beer and similar goods, these temporary hoops are driven onto the barrel shells very securely and under heavy power so as to reliably hold the staves in place to receive the permanent hoops, and it therefore also requires considerable power to remove these temporary hoops from the shell.

It is the object of this invention to provide a machine whereby the removal of such temporary hoops from barrel shells may be effected easily, quickly and economically.

In the accompanying drawings:

Fig. 2 is a rear elevation of the same.

Similar characters of reference indicate corresponding parts throughout the several views.

Although the main frame of this machine may be variously constructed to support the various movable parts, the same, as shown in the drawings, preferably comprises a horizontal base or sill 1, and two standards or posts 2, 3, rising from opposite ends of the base. The barrel shell or body 4 from which the temporary hoops 5 are to be removed is moved by any suitable means, either manually or automatically, from one side of this frame into the space between the base and standards where it remains at rest until the operation of removing the temporary hoops has been completed, and then the separated barrel shell and temporary hoops are discharged from the opposite side of the frame preparatory to performing other operations on the barrel for completing it.

For the purpose of guiding the barrel shell into the main frame on the receiving side thereof and discharging the same from its opposite side, means are provided which preferably comprise a plurality of tracks or rails mounted on the base of the frame and consisting of two longitudinal horizontal receiving sections 6, 6, arranged on the front side of the frame and two inclined delivery sections 7, 7 which slope rearwardly and downwardly from the rear ends of the horizontal sections of the rails. Endwise displacement of the barrel is prevented as the same moves forwardly over the receiving parts 6, 6, of the supporting rails, this being preferably accomplished by two longitudinal guide bars 8, 8, arrranged horizontally adjacent to opposite ends of the path of the barrel, two supporting arms 9, 9, each projecting laterally from the rear end of each of the end guide bars, and two brackets 10, 10, mounted on the front sides of the frame standards and each provided with a horizontal transverse socket in which the supporting arm 9 of the respective end guide bar is secured by means of set screws 11. By means of the latter the end guide bars 8, 8, may be moved toward and from each other to suit the length of the barrel from which the hoops are to be removed.

Figure 1:
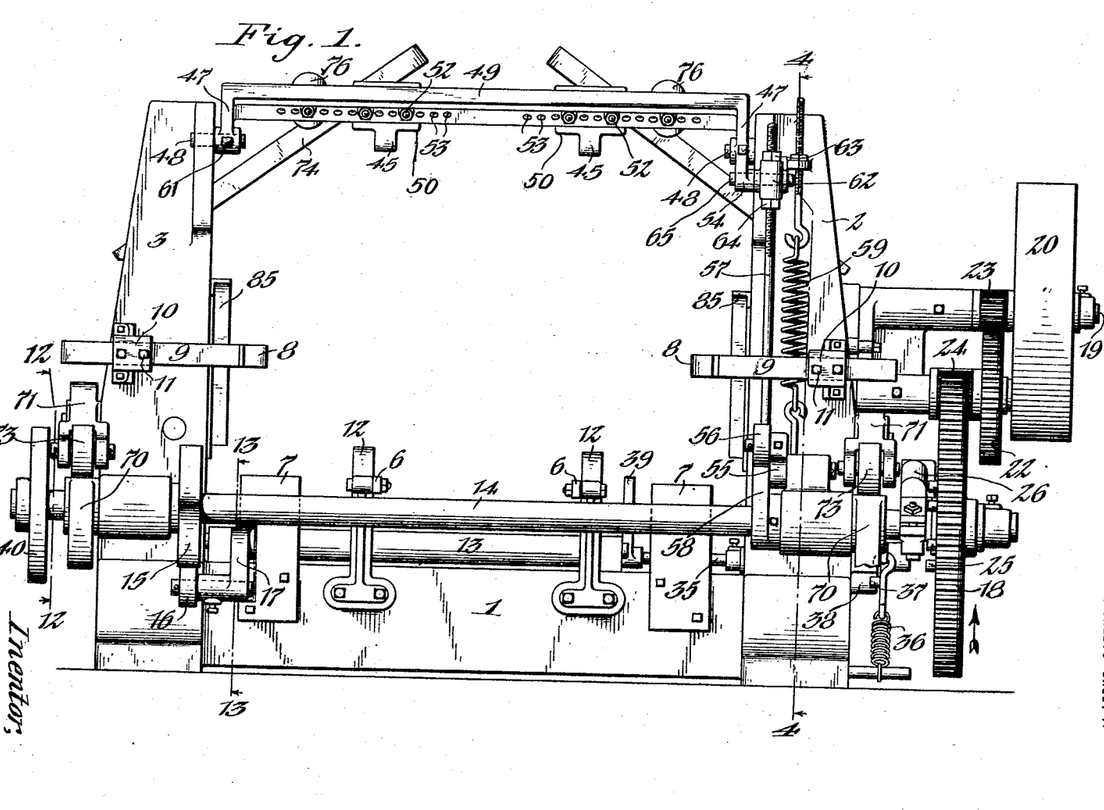
Figure 1 is a front elevation of a machine for removing hoops from barrel shells, embodying my invention.
Figures 3, 5:
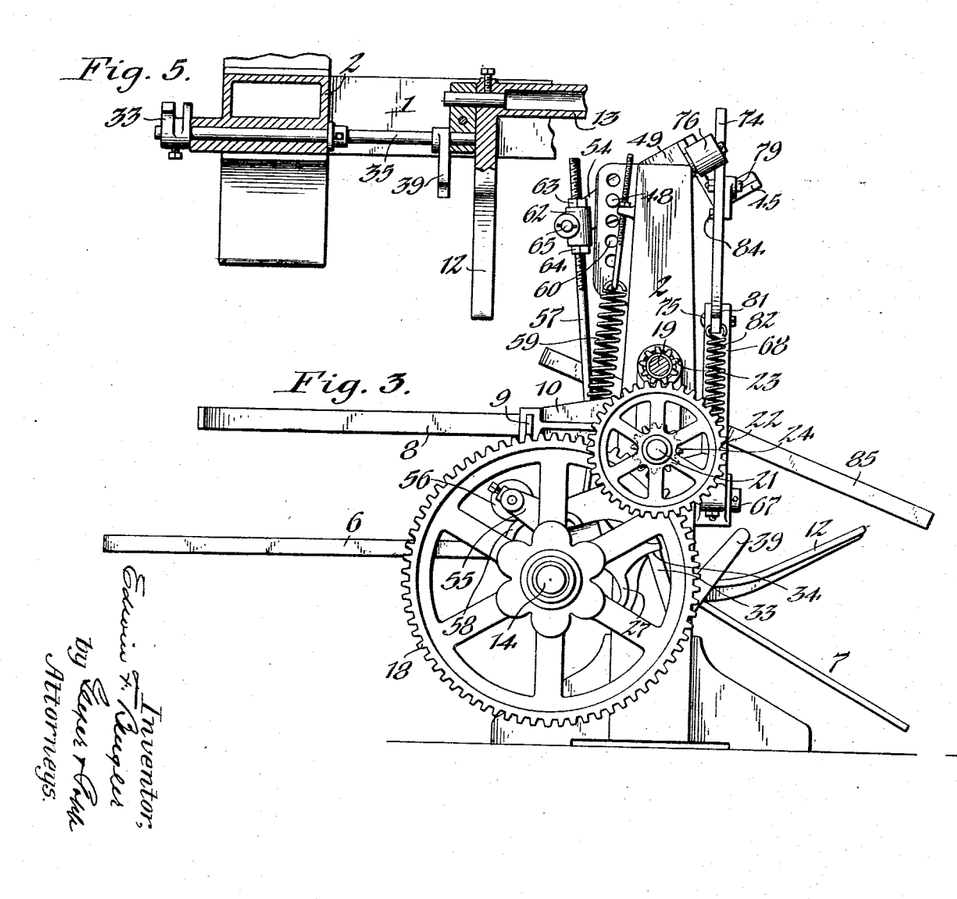
Fig. 3 is an end elevation thereof viewed from the right hand side.
Fig. 5 is a fragmentary horizontal section taken on line 5—5, Fig. 2.
Figure 4:
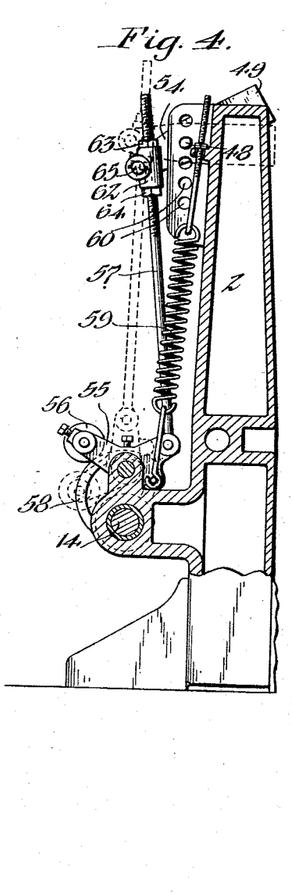
Fig. 4 is a fragmentary vertical longitudinal section taken on the correspondingly numbered line in Fig. 1.
Figures 11, 12, 13:
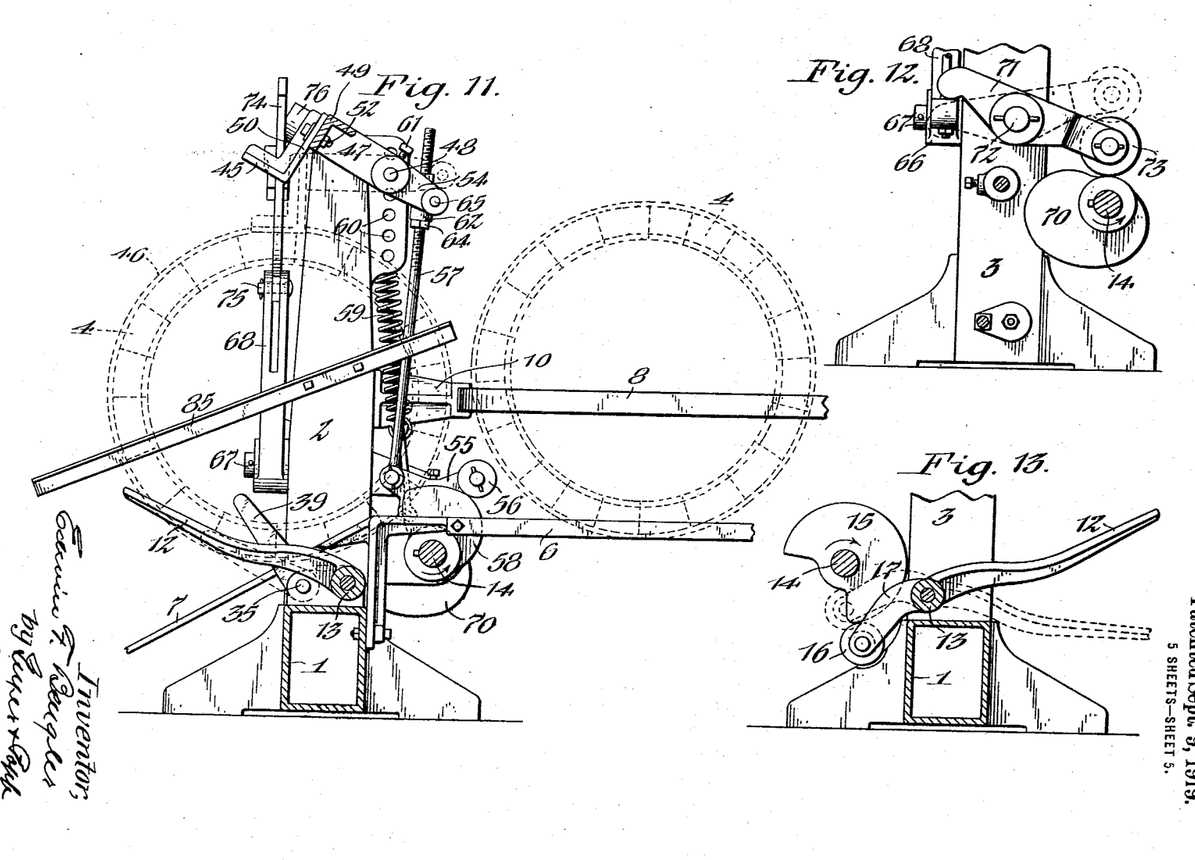
Fig. 11 is a vertical longitudinal section of the machine taken on the correspondingly numbered line in Fig. 2.
Figs. 12 and 13 are fragmentary vertical sections, taken on the correspondingly numbered lines in Fig. 1.

The barrel which is being operated upon is held in its proper working position by means of the inclined rear portions 7, 7, of the lower guide rails and also by means which comprise two vertically swinging supporting arms 12, 12, which normally project upwardly and rearwardly across the plane of the rear portions 7, 7 of the lower guide rails and form with the latter a substantially concave seat or saddle in which the barrel rests with its underside and is retained in its central position while the operation of removing the temporary hoops therefrom is being effected. These supporting arms are mounted at their front ends on a horizontal rock shaft 13 which is arranged transversely below the lower supporting rails and is journaled in suitable bearings on the frame standards. This rock shaft is so operated that the same is turned in the direction for raising the supporting arms across the plane of the inclined rear portions 7, 7, of the lower supporting rails and holds the same at rest while the temporary hoops are being removed from the barrel, and after such removal has been completed the rock shaft is turned in the opposite direction so as to lower the supporting arms and permit the barrel to roll downwardly over the inclined track sections 7, 7. This operation of this shaft and the parts associated therewith is preferably effected by means which comprise a main driving shaft 14 arranged horizontally and transversely below the front sections 6, 6, of the supporting tracks and journaled near its opposite ends in suitable bearings on the standards, and a cam 15 arranged on the main driving shaft and engaging with a roller 16 mounted on a cam arm 17 projecting forwardly from this rock shaft, as best shown in Figs. 1 and 13. The raising of the supporting arms 12 is effected at the proper time and they are retained at rest a sufficient length of time in this elevated position by the high or salient face of the cam 15 which has a dwell of sufficient length for this purpose, and when the receding or low face of this cam is presented to the roller 16 then the supporting arms 12 drop by gravity aided by the weight of the barrel which may be resting upon the same. The weight of these arms preponderates over the weight of the cam arm and its roller, so that the supporting arms will drop even though no barrel is resting thereon.

The various working parts of this machine are so organized and timed that a complete cycle of operations is effected during each complete rotation of the main driving shaft and a clutch mechanism is provided which automatically connects the driving shaft with the driving mechanism when a barrel has been fed into the operating position in the machine and permits a cycle of operations of the machine to be effected and then automatically arrests the operation of the machine after a cycle of operations has been completed. This clutch mechanism is preferably operated automatically upon the feeding or placing of a barrel into the operating position in the machine, and in its preferred form this clutch mechanism together with the driving mechanism associated therewith is constructed as follows:

18 represents a main driven gear wheel which is mounted loosely upon the right hand end of the main driving shaft and adapted to be coupled and uncoupled therefrom. 19 represents a primary shaft journaled in a suitable bearing on the right-hand standard of the frame and provided with a driving pulley 20 to which power is transmitted by a belt from any suitable source. 21 represents an intermediate shaft journaled in a bearing on the right hand standard and provided with a gear wheel 22 which meshes with a pinion 23 on the primary shaft and also provided with an intermediate pinion 24 which meshes with the main gear wheel 18, as best shown in Figs. 1, 2, 3 and 7. By this means the driving pulley may be run at comparatively high speed and the driving shaft turned at a comparatively slow speed but with increased power owing to the stepping down of the speed between the primary shaft and the main driving shaft by the intermediate reducing gearing.

Figures 6, 7, 8, 9, 10:
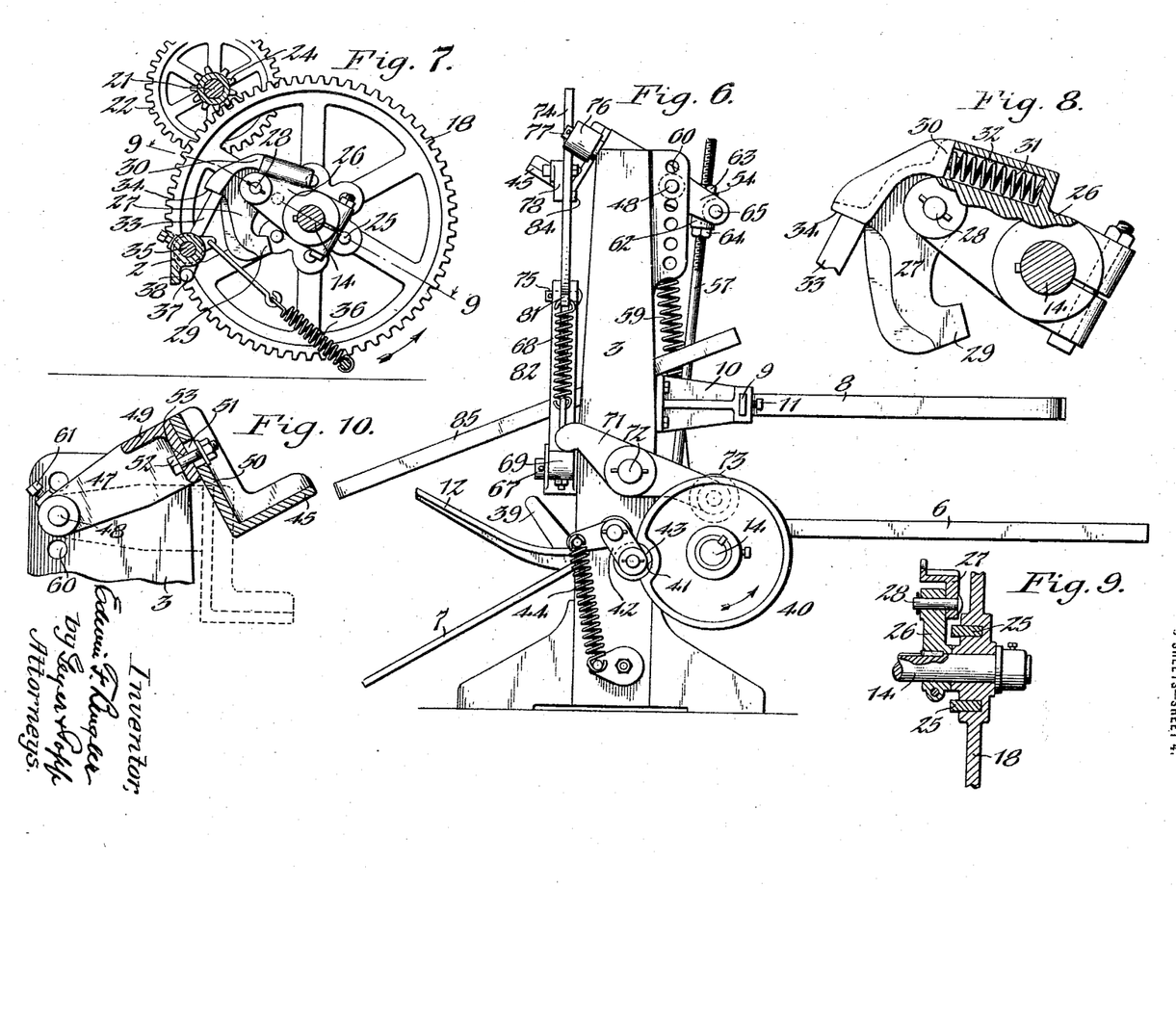
Fig. 6 is an end elevation of the machine viewed from the left hand end thereof.
Fig. 7 is a fragmentary vertical longitudinal section taken on line 7—7, Fig. 2.
Fig. 8 is a similar view of the parts shown in Fig. 7, but on an enlarged scale and partly in section.
Fig. 9 is a fragmentary sectional view taken on line 9—9, Fig. 7.
Fig. 10 is a fragmentary vertical section taken on line 10—10, Fig. 2.

The coupling or clutch for connecting and disconnecting the main driving shaft and main gear wheel 18 may be variously constructed, but as shown in the drawings, see particularly Figs. 1, 2, 3, 7, 8 and 9, the same preferably comprises a plurality of coupling or clutch pins 25 preferably six in number, arranged on the hub of the driving gear wheel in a row concentrically around the axis of the same and the driving shaft, a driving or clutch arm 26 secured to the main driving shaft adjacent to the gear wheel 18, a coupling dog 27 pivoted by means of a pin 28 to the driving arm and provided in front of its pivot with a hook 29 and in rear of its pivot with a tail 30, a spring 31 arranged in a socket 32 on the driving arm and bearing against the tail of the coupling dog and tending constantly to move the latter in a direction in which its hook projects across the path of the coupling pins, and a releasing arm 33 movable into and out of the path of a nose or lug 34 on the outer side of the coupling dog and adapted to turn the latter in a direction for moving its hook out of the path of the coupling pins. The releasing arm 33 is mounted on a trip rock shaft 35 which is journaled horizontally and transversely of the main frame below the inclined sections of the lower guide rails and is yieldingly turned in a direction for bringing the releasing arm into the path of the nose on the coupling dog by means of a spring 36 connecting this arm with an adjacent part of the main frame, as best shown in Figs. 1, 2 and 7. The extent of movement of the releasing arm and the parts connected therewith under the action of this spring 36 is limited by means of a stop 37 mounted on the trip shaft and engaging with a stop face 38 on the adjacent part of the main frame, as shown in Fig. 7. 39 represents a trip arm arranged on the trip shaft and adapted to project upwardly and rearwardly into the path of the barrels at the operating position when no barrel is present, but, which is adapted to be depressed by a barrel placed into the operative position and thereby cause the clutch to be operated so as to couple the driving gear wheel 18 with the driving shaft. As shown in Fig. 11, the trip arm projects upwardly and rearwardly into the path of the barrels at the working position, at which time the releasing arm is in engagement with the clutch dog and the latter is turned so that its hook is out of the path of the coupling pins of the gear wheel 18, and the latter turns idle, leaving the main driving shaft at rest. The trip shaft and the parts mounted thereon are yieldingly held in this position at this time by the spring 36. If now a barrel is introduced into the machine so that it occupies the working or operating position upon the seat or saddle formed by the inclined rear sections 7, 7, of the supporting rails and the elevated supporting arms 12, the trip arm will be depressed from the position shown by full lines in Fig. 11 to the position shown by the dotted lines of the corresponding part, thereby causing the releasing arm 33 to be moved out of engagement from the nose of the coupling dog in opposition to the spring 36. The instant this occurs, the spring 31 on the driving arm causes the coupling dog to be turned in the direction for carrying its hook into the path of the coupling pins, so that the next following coupling pin engages with this hook and thereby compels the driving shaft to turn with the constantly-turning gear wheel 18. At the beginning of this rotation of the driving shaft the front end of the salient part or dwell portion of the cam 15 is in engagement with the roller 16 of the cam arm 17 and continues to remain in engagement therewith until the operation of removing the hoops from the barrel has been effected by mechanism which will be hereinafter described, and when such removal has been effected, the lower receding face of this cam is presented to the roller 16 so as to permit the supporting arms 12 to drop and discharge the stripped barrel after which the front end of the high part of the cam again engages with the roller 16 and raises the supporting arms preparatory to receiving the next following barrel which is to be stripped of its temporary hoops. The main driving shaft completes its rotation after the return of the supporting arms 12 to their elevated operative position, at which time the stripped barrel also clears the trip arm 39 so that the latter is free to be raised into its operative position by the action of the spring 36 and the releasing arm 33 is moved into the path of the nose or tail of the coupling dog and the hook of the latter is moved out of engagement from the respective coupling pin 25, whereby the rotation of the driving shaft is arrested and the gear wheel 18 continues to rotate independently thereof.

In order to insure a complete rotation of the main driving shaft and cause the same to be arrested at a definite point after each cycle of operations, a centering device is provided which preferably comprises a centering wheel 40 secured to the left hand end of the driving shaft and provided in its periphery with a curved centering recess or notch 41, a centering lever 42 pivoted on the adjacent standard of the frame and provided on one of its arms with a centering roller 43 adapted to engage with the periphery and the notch of said centering roller, and a spring 44 connecting the other arm of the centering lever with the main frame. As the coupling dog is disengaged from the respective coupling pin of the gear wheel, the centering roller 43 has partly entered the notch 41 of the centering wheel and owing to the tension exerted at this time against this roller by means of the spring 44, the inward pressure of this roller against the cam-shaped surface of this centering notch causes the centering wheel to be advanced slightly with a cam action until this roller is fully seated in the notch of this wheel, thereby not only completing the throw of the main shaft, if the same tends to lag behind somewhat after being uncoupled from the driving wheel 18, but also holding this driving shaft definitely in the place where the same should begin the next cycle of operations of the machine.

After a barrel has been placed in the working or operating position of the machine, and the trip arm 39 has been depressed so as to couple the driving shaft with the source of power, the means which hold the barrel in its operating position and strip the temporary hoops therefrom come into action. These holding means comprise two vertically movable grippers or jaws 45 which are adapted to engage the upper surface of the barrel shell lengthwise on opposite sides of its bilge, each of these jaws being preferably arranged to engage the shell between one of the permanent bilge hoops 46 and the adjacent temporary hoop 5. These two holding jaws are mounted on a vertically-swinging yoke which comprises two rock arms 47 pivoted by means of horizontal transverse pins 48 on the upper parts of the standards, and a cross bar 49 connecting the rear ends of these rock arms and carrying the holding or gripping jaws 45. The latter are preferably so mounted on the cross bar of the yoke as to be capable of horizontal as well as vertical movement thereto, this being preferably effected, as shown in Figs. 1, 2 and 11, by means of adjusting plates 50 each of which carries one of the clamping jaws 45 and is provided with two vertical slots 51 and is secured to the cross bar of the yoke by means of a pair of bolts 52 passing through the slots 51 and one or another pair of openings 53 formed in a horizontal row in the cross bar of the yoke. By moving the plate 50 vertically on the bolts 52 and shifting the latter into the appropriate openings 53 of the yoke, it is possible to adjust the respective clamping or holding jaw within certain limits to barrels varying in diameter and length which are operated upon by the machine.

Although various means may be provided for rocking the yoke so as to move its clamping jaws into and out of their operative position, those which are shown in the drawings have been found satisfactory in practice and are therefore preferred, and as there shown the same comprise a forward extension 54 arranged on one of the rock arms 47 so that the same in effect forms a double-armed lever, a lower cam lever 55 pivoted to swing vertically on the lower part of the adjacent standard and provided on one of its arms with a roller 56 while its other arm is connected by means of an upright rod 57 with the lever 54, a rotary cam 58 mounted on the main shaft and engaging with the roller 56, and a spring 59 connecting the cam lever 55 with an adjacent part of the main frame. While the machine is at rest and no barrel is in the working position therein, the salient or high face of the cam 58 engages with the roller of the cam lever 55 and turns the same in the direction for raising the yoke and lifting the clamping jaws 45 out of the path of the barrel. After a barrel has been placed into the working position of the machine and the clutch has been tripped so as to start the working of the machine, then the low face of the cam 58 is presented to the roller 56 of the cam lever, thereby permitting the spring 59 to turn the latter in the opposite direction so that the yoke is lowered and the upper gripping jaws 45 are caused to bear against the upper side of the barrel and hold the latter in place during the subsequent operation of stripping the temporary hoops therefrom. The yoke is capable of being adjusted bodily in a vertical direction on the end frame and the connection between its cam lever 55 and the shifting rod 57 is also made adjustable, so as to permit of adapting the machine to strip the temporary hoops from barrels which vary in diameter. As shown in Figs. 1, 2, 6 and 11, the adjustment of the yoke on the frame is preferably effected by shifting the pivot pins 48 of the yoke into one or another pair of corresponding openings 60 formed in two upright rows on the upper parts of the standards and securing these pins in place by means of set screws 61 arranged in the hubs of the yoke and engaging with these pivot pins. The adjustable connection between the yoke-lever 54 and the shifting rod 57 is preferably effected by means of an upright adjusting sleeve 62 which receives the externally screw-threaded upper end of this adjusting rod, screw nuts 63, 64 applied to this rod above and below this adjusting sleeve and a horizontal transverse pivot pin 65 connecting the adjusting sleeve 62 with the yoke-lever 54. By shifting the screw nuts 63, 64, on the rod 57, the position of the latter with reference to the yoke may be adjusted in harmony with the adjustment of the yoke on the frame to suit the requirements for properly clamping different diameters of barrels which are to be stripped.

After the clamping jaws 45 have been thus lowered into engagement with the upper side of the barrel, the means which strip or remove the temporary hoops from the ends of the barrel perform their function and in the preferred form of these means, as shown in Figs. 1, 2, 6 and 11, the same are constructed as follows:

66 represents the hubs of two pulling levers each of which is of elbow-shape and pivoted by means of a pin 67 on the rear side of one of the standards, so as to swing in a vertical plane and has one of its arms 68 projecting upwardly while its other or lower arm 69 projects laterally. 70 represents two pulling cams arranged on opposite ends of the main driving shaft adjacent to the outer side of the standards. 71 represents two intermediate cam levers each of which is pivoted by means of a horizontal transverse pin 72 to the outer side of one of the standards so as to swing in a vertical plane and provided on its front arm with a roller 73 which engages with the respective pulling cam 70 while its rear arm engages with the upper side of the lower arm of the respective elbow pull lever 66.

74, 74 represent two pull bars or rods which are arranged transversely in rear of the upper parts of the standards with their opposing inner ends overhanging the opposite ends of the place where the barrels come to rest while being operated upon. Each of these pull bars is pivoted at its outer end to the upper arm 68 of one of the pull levers by means of a horizontal longitudinal pin 75, so that this bar can swing in a vertical plane. On the upper side of its inner end each of these pull bars engages with the underside of a tappet 76 on the yoke, this tappet being preferably constructed in the form of a roller which is pivoted to the yoke by means of a pin 77 passing through an opening in the yoke cross bar. On its underside each of the pull bars is provided at its inner end part with a claw or hook 78 which engages its upper part with the upright side of the pull bar and is preferably constructed of triangular form and capable of longitudinal adjustment on the pull bar by means of a bolt 79 passing through this claw and one or another of a longitudinal row of openings 80 in the pull bar. Projecting outwardly from each pull bar beyond its pivotal connection with the respective pull lever 66 is a tail or extension 81 of this bar which is connected with the lower arm of the respective pull lever 66 by means of a spring 82. The latter operates to hold the lower arm of the pull lever yieldingly in contact with the underside of the rear arm of the cam lever 71 and also yieldingly holds the inner end of the respective pull bar against the underside of the tappet 76.

While the machine is at rest and no barrel is present in the working position, the parts of the temporary hoop stripping or pulling mechanism are in the position indicated by full lines in Figs. 1, 2, 6, 10, 11 and 12. In this position, the pull levers 66 are turned so that their upper arms are in their innermost position and the pull bars are raised into their highest position by means of the springs 82, so that the claws of the pull bars and the gripping jaws of the yoke are elevated out of the path of the barrel. If now a barrel is placed in the working position and the machine begins a cycle of operations by reason of the depression of the trip arm by the barrel, the lowering of the yoke for engaging the clamping jaws with the upper side of the barrel also causes the pull bars to be lowered by engagement of the tappets on the yoke with the upper sides of these bars, so that in the lowered position of these pull bars their claws engage with or are arranged close to the upper side of the barrel adjacent to the inner edges of the temporary end hoops. Immediately after the pull bars have been thus lowered, the high parts of the pull cams 70 engage with the rollers of the cam levers 71 and turn the latter from the position indicated by full lines in Fig. 12 to the position shown by dotted lines in the same figure, whereby each of the pull levers and its companion pull bar and associated claw are moved from their innermost position to their outermost positions indicated by dotted lines in Fig. 2. During this movement the two claws of the pull levers engage with the inner sides or edges of the temporary end hoops on the barrel at the top of the latter and forcibly strip or remove the same from the barrel, as indicated by dotted lines in the last-mentioned figure. After this occurs, the low parts of the pulling cams 70 are again presented to the cam levers 71 and the high part of the cam 58 is presented to the lever 55, thereby causing the yoke to be elevated, the pull levers to be turned so that their upper arms swing inwardly and the pull bars to be elevated by means of the spring 82, so that the pulling mechanism again clears the path of the barrel. In order to permit of adjusting each pull bar on the respective pull lever to suit barrels of different diameters, the upper arm of this lever is provided with a radial row of openings 83 into one or the other of which the pivot pin 75 of the pull bar may be placed to suit the diameter of the barrel which is being operated upon. By shifting the claw lengthwise on the pull bar, this claw may be adapted for pulling off the hoops from barrels which vary in length. Each of the claws is provided on its lower part with a laterally-projecting lip 84 which engages with the underside of the respective pull bar so as to prevent this claw from turning on the pull bar while in use. By constructing each of the claws of triangular form, it is possible to reverse the same end for end so that when one of its hook-shaped ends becomes worn, a reversal of this claw on the pull bar will bring the other or new end of the claw into its operative position and thus prolong the utility of the same accordingly.

Immediately after the pulling operation has been completed and the presser jaws and pulling claws have resumed their normal inoperative position, the machine completes its cycle of operations during which the supporting arms 12 are permitted to drop for discharging the barrel rearwardly along the rear rail sections 7, 7, and these supporting arms are then again raised into their elevated position preparatory to receiving the next barrel which is to be stripped.

While the barrel is being discharged from the rear side of the machine by rolling down the rear inclined track sections 7, 7, the detached temporary end hoops 5 also roll down these track sections and are taken care of by the attendants. In order to prevent these removed temporary end hoops from interfering with the working parts of the machine and also causing them to be directed rearwardly from the machine, two rear side guide bars 85 are provided which are secured to the inner sides of the standards and extend rearwardly therefrom, so that they support the upper parts of the removed temporary end hoops and direct them rearwardly from the machine.

Taken as a whole, this machine is very compact and durable in construction and very efficient in operation and is capable of stripping hoops from barrels expeditiously and economically with a minimum expenditure of power.

I claim as my invention:

1. A machine for removing hoops from barrels comprising a support for the barrel, means for engaging a hoop on said barrel and removing the same lengthwise therefrom and actuating means for moving said hoop engaging means inwardly in an inoperative position and outwardly in an operative position.

2. A machine for removing hoops from barrels comprising a main frame, a support for engaging the barrel on its underside, means for engaging the hoops on the upper side of the barrel and removing the same therefrom and actuating means for moving said hoop engaging means inwardly in an inoperative position and outwardly in an operative position.

3. A machine for removing hoops from barrels comprising a main frame, a support for engaging the barrel on its underside, means for engaging the hoops on the upper side of the barrel and removing the same therefrom, comprising two transversely movable pulling bars, each of which is provided with a claw adapted to engage a hoop on the barrel and means for shifting said bars into their inoperative position while moving inwardly and into their operative position while moving outwardly.

4. A machine for removing hoops from barrels, comprising a main frame, a support for engaging the barrel on its underside, means for engaging the hoops on the upper side of the barrel and removing the same therefrom, comprising two transversely movable pulling bars, claws arranged on said bars and adapted to engage the hoops on the barrel, means for imparting a vertically reciprocating movement to said bars, comprising a yoke pivoted on said frame to swing vertically, and tappets arranged on said yoke and engaging with said bars, and means for longitudinally reciprocating said bars.

5. A machine for removing hoops from barrels, comprising a main frame, a support for engaging the barrel on its underside, means for engaging the hoops on the upper side of the barrel and removing the same therefrom, comprising two transversely movable pulling bars, claws arranged on said bars and adapted to engage the hoops on the barrel, means for imparting a vertically reciprocating movement to said bars comprising a yoke pivoted on said frame to swing vertically, tappets arranged on said yoke and engaging with said bars, a rotary cam, a cam lever engaging with said cam, and a connecting rod connecting said cam lever with said yoke, and means for longitudinally reciprocating said bars.

6. A machine for removing hoops from barrels, comprising a main frame, a support for engaging the barrel on its underside, means for engaging the hoops on the upper side of the barrel and removing the same therefrom, comprising two transversely movable pulling bars, claws arranged on said bars and adapted to engage the hoops on the barrel, means for imparting a vertically reciprocating movement to said bars comprising a yoke pivoted on said frame to swing vertically, tappets arranged on said yoke and engaging with said bars, a rotary cam, a cam lever engaging with said cam, and a connecting rod connecting said cam lever with said yoke, holding jaws arranged on said yoke and adapted to engage the upper side of the barrel, and means for longitudinally reciprocating said bars.

7. A machine for removing hoops from barrels comprising a main frame, a support for engaging the barrel on its underside, means for engaging the hoops on the upper side of the barrel and removing the same therefrom, and means for holding the barrel while the hoops are being removed therefrom and constructed to move toward and from the periphery thereof.

8. A machine for removing hoops from barrels comprising a main frame, a support for engaging the barrel on its underside, means for engaging the hoops on the upper side of the barrel and removing the same therefrom, and means for holding the barrel while the hoops are being removed therefrom, comprising a yoke pivoted on said frame to swing vertically, holding jaws mounted on said yoke and adapted to engage the upper side of the barrel, a rotary cam, a cam lever engaging said cam, and a rod connecting said cam lever and yoke.

9. A machine for removing hoops from barrels comprising a main frame, a support for engaging the barrel on its underside, means for engaging the hoops on the upper side of the barrel and removing the same therefrom, and means for holding the barrel while the hoops are being removed therefrom comprising a yoke pivoted on said frame to swing vertically and provided with longitudinal rows of openings, holding jaws adapted to engage the upper side of said barrel and provided with attached plates having vertical slots, and bolts passing through said slots and said openings in the yoke.

10. A machine for removing hoops from barrels comprising a main frame, a support for engaging the barrel on its underside, means for engaging the hoops on the upper side of the barrel and removing the same therefrom comprising pulling bars arranged transversely above the path of the barrels, claws arranged on the bars and adapted to engage the hoops of the barrels, means for imparting a vertical movement to said bars, and means for moving said bars horizontally inwardly in a raised inoperative position and outwardly in a depressed operative position comprising elbow levers pivoted on said frame to swing vertically and transversely and having their upper arms pivotally connected with said pull bars, cam levers pivoted on said frame to swing vertically and lengthwise and engaging the lower arms of said elbow levers, and rotary cams engaging said cam levers.

11. A machine for removing hoops from barrels comprising a main frame, a support for engaging the barrel on its underside, means for engaging the hoops on the upper side of the barrel and removing the same therefrom comprising pulling bars arranged transversely above the path of the barrels, claws arranged on the bars and adapted to engage the hoops of the barrels, means for imparting a vertical movement to said bars, means for moving said bars horizontally comprising elbow levers pivoted on said frame to swing vertically and transversely and having their upper arms pivotally connected with said pull bars, cam levers pivoted on said frame to swing vertically and lengthwise and engaging the lower arms of said elbow levers, rotary cams engaging said cam levers, vertically movable tappets engaging with said bars, springs connecting said bars with the lower arms of said elbow levers, and means for moving the tappets to engage said bars as the pull which removes the hoops is taking place.

12. A machine for removing hoops from barrels comprising a main frame, means for supporting the barrels in the working position, means for engaging the hoops and removing the same from the shell of the barrel, a driving mechanism, a clutch for coupling and uncoupling said driving mechanism and hoop removing means, a trip arm arranged in the path of the barrels and adapted to be shifted by the latter when in the working position, and means for transmitting the movement of said trip arm under the action of a barrel to said clutch for coupling the same.

EDWIN F. BEUGLER.

Copies of this patent may be obtained for five cents each, by addressing the "Commissioner of Patents, Washington, D. C."